(12) United States Patent
Qin

(10) Patent No.: US 11,846,781 B2
(45) Date of Patent: Dec. 19, 2023

(54) THIN TYPE LARGE FIELD OF VIEW NEAR-EYE DISPLAY DEVICE

(71) Applicant: BEIJING ANTVR TECHNOLOGY CO., LTD., Beijing (CN)

(72) Inventor: Zheng Qin, Beijing (CN)

(73) Assignee: BEIJING ANTVR TECHNOLOGY CO., LTD., Beijing (CN)

( * ) Notice: Subject to any disclaimer, the term of this patent is extended or adjusted under 35 U.S.C. 154(b) by 15 days.

(21) Appl. No.: 17/719,482

(22) Filed: Apr. 13, 2022

(65) Prior Publication Data

US 2022/0244545 A1 Aug. 4, 2022

Related U.S. Application Data

(63) Continuation-in-part of application No. 17/420,526, filed as application No. PCT/CN2018/108550 on Sep. 29, 2018.

(30) Foreign Application Priority Data

Mar. 15, 2022 (CN) .......................... 202220558506.4

(51) Int. Cl.
*G02B 27/01* (2006.01)
*G02B 27/14* (2006.01)

(52) U.S. Cl.
CPC ......... *G02B 27/0172* (2013.01); *G02B 27/14* (2013.01); *G02B 2027/0123* (2013.01)

(58) Field of Classification Search
CPC .. G02B 27/0172; G02B 27/14; G02B 27/283; G02B 2027/0123
See application file for complete search history.

(56) References Cited

U.S. PATENT DOCUMENTS

2004/0150888 A1* 8/2004 Domjan ................. G02B 30/34
359/630
2016/0363770 A1* 12/2016 Kim .................... G02B 27/0093
2018/0367769 A1* 12/2018 Greenberg ......... G02B 27/0179

* cited by examiner

*Primary Examiner* — Brent D Castiaux
(74) *Attorney, Agent, or Firm* — Locke Lord LLP; Tim Tingkang Xia, Esq.

(57) ABSTRACT

The present invention discloses a thin type large field of view near-eye display device, which comprises two or more radial reflection units, which are arranged in front of human eyes to generate two or more sub-images and spliced into a larger image on the retina of human eyes, so as to realize a near-eye display effect with a large field of view in a thinner volume; the radial reflection units comprise a light source, a reflecting surface, a transmissive dioptric apparatus and/or a reflective optical component, and the present invention relates to the technical field of near-eye display devices. The thin type large field of view near-eye display device realizes the nesting of images with various definitions by adopting different areas of the same screen, and is widely used as a low-cost display solution to improve the definition of the central area.

5 Claims, 2 Drawing Sheets

THIN TYPE LARGE FIELD OF VIEW NEAR-EYE DISPLAY DEVICE

CROSS-REFERENCE TO RELATED PATENT APPLICATION

This application is a continuation-in-part of U.S. patent application Ser. No. 17/420,526, filed on Jul. 2, 2021, which itself is a U.S. National Stage application of International Patent Application No. PCT/CN2018/108550, filed on Sep. 29, 2018. This application also claims priority to and the benefit of, pursuant to 35 U.S.C. § 119(a), patent application Serial No. CN202220558506.4 filed in China on Mar. 15, 2022. The disclosure of each of the above applications is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

TECHNICAL FIELD

The present invention relates to the technical field of near-eye display devices, in particular to a thin type large field of view near-eye display device.

BACKGROUND

In the near-eye display system, in order to form a large field of view display effect, generally speaking, a large-caliber imaging system is needed, and the focal length of the large-caliber imaging system is generally not too small, and the focal length represents the axial thickness of the near-eye display device. Therefore, it is not easy to manufacture a slim large field of view glasses display under the current industry situation.

On the basis of keeping the larger aperture of the imaging system, the thickness of the device is converted into a radial size by using radial reflection units, and a plurality of radial reflection units in the same direction or different directions are used to realize a larger field of view through splicing imaging, while maintaining the overall sheet shape of the device, which is more suitable for manufacturing thin and portable glasses display products. This invention provides a thin type large field of view near-eye display device.

SUMMARY

In view of the shortcomings of the prior art, the present invention provides a thin type large field of view near-eye display device, which solves the problem that it is not easy to manufacture a slim large field of view glasses display in the existing near-eye display system.

In order to achieve the above purpose, the present invention is realized by the following technical solution: a thin type large field of view near-eye display device, comprising two or more radial reflection units arranged in front of human eyes to generate two or more sub-images, which are spliced into a larger image on the retina of human eyes, so as to realize a near-eye display effect with a large field of view in a thinner volume.

Preferably, the radial reflection unit comprises a light source, a reflecting surface, a transmissive dioptric apparatus and/or a reflective optical component, and the light emitted by the light source is refracted and amplified by the transmissive dioptric apparatus or the reflective optical component, so that human eyes can see clearly.

Preferably, two display light paths with different light path lengths project two sub-images with overlapping centers on the retina of human eyes, one sub-image is larger, which provides a wide edge field of vision, and the other sub-image is smaller, which provides a high-definition field of vision in the center, thereby providing a near-eye display effect with a wide field of view and a clear center.

Preferably, the light sources used by the two different display light paths come from different areas of a same screen, so only one screen is needed, thereby reducing the cost.

Preferably, the display light path unit comprises a light source, a reflecting surface, a transmissive dioptric apparatus and/or a reflective optical component.

Preferably, the light emitted by the light source is reflected twice or more in the process of being reflected into a final outgoing light, and finally enters the human eyes.

Preferably, the display light path comprises a multi-reflection structure, which comprises multiple reflecting surfaces and/or polarizers, and/or multi-reflection prisms, and/or multi-reflection waveguide plates, and/or polarization transmitters, and/or polarization changing reflectors and/or polarization changers.

Beneficial Effects

The present invention provides a thin type large field of view near-eye display device. Compared with the prior art, it has the following beneficial effects:

The thin type large field of view near-eye display device adopts two or more radial reflection units arranged in front of human eyes, and the images with a large area are projected and spliced on the retina of human eyes, so that a near-eye display effect with a large field of view can be realized in a thin volume, and different areas of the same screen can be used to nest images with various definitions, so that it can be widely used as a low-cost display solution for improving the definition of the central area.

DETAILED DESCRIPTION

Figure 1A:
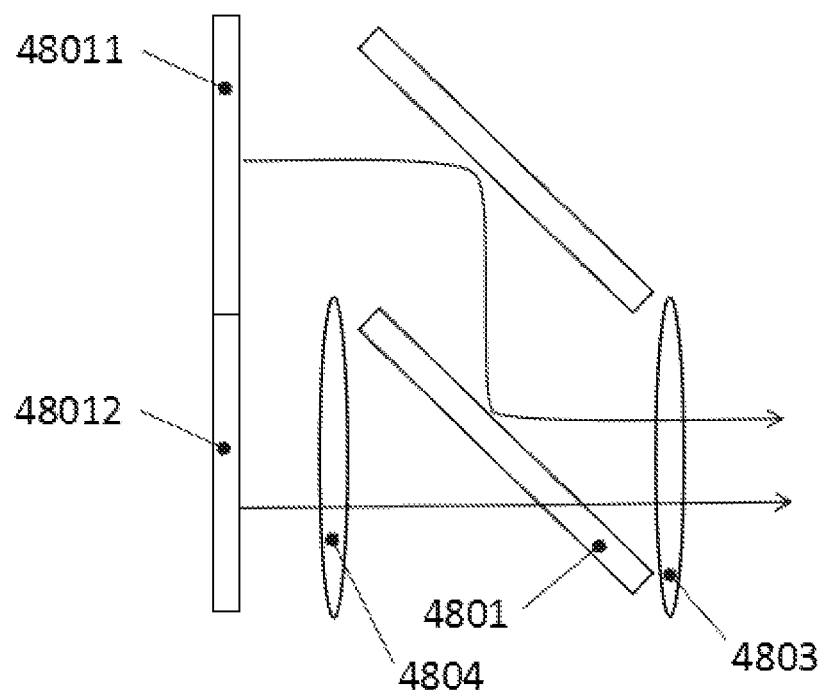
FIG. 1a shows the concrete structural diagram of an embodiment of the present invention.

The technical solution in the embodiment of the present invention will be clearly and completely described below with reference to the drawings of the present invention. Obviously, the described embodiment is only a part of the embodiment of the present invention, not all the embodiments. Based on the examples in this invention, all other examples obtained by those skilled in the art without creative work are within the scope of protection of this invention.

Please refer to the figures, the present invention provides a technical solution: a thin type large field of view near-eye display device, comprising two or more radial reflection units arranged in front of human eyes to generate two or more sub-images, which are spliced into a larger image on the retina of human eyes, so as to realize a near-eye display effect with a large field of view in a thinner volume.

In the embodiment of the present invention, the radial reflection unit comprises a light source, a reflecting surface, a transmissive dioptric apparatus and/or a reflective optical component, and the light emitted by the light source is refracted and amplified by the transmissive dioptric apparatus or the reflective optical component, so that human eyes can see clearly.

In the embodiment of the present invention, two display light paths with different light path lengths project two sub-images with overlapping centers on the retina of human eyes, one sub-image is larger, which provides a wide edge field of vision, and the other sub-image is smaller, which provides a high-definition field of vision in the center, thereby providing a near-eye display effect with a wide field of view and a clear center.

In the embodiment of the present invention, the light sources used by the two different display light paths come from different areas of a same screen, so only one screen is needed, thereby reducing the cost.

In the embodiment of the present invention, the display light path unit comprises a light source, a reflecting surface, a transmissive dioptric apparatus and/or a reflective optical component.

In the embodiment of the present invention, the light emitted by the light source is reflected twice or more in the process of being reflected into a final outgoing light, and finally enters the human eyes.

In the embodiment of the present invention, the display light path comprises a multi-reflection structure, which comprises multiple reflecting surfaces and/or polarizers, and/or multi-reflection prisms, and/or multi-reflection waveguide plates, and/or polarization transmitters, and/or polarization changing reflectors and/or polarization changers.

Solution One

FIGS. 1a, 1b, 1c and 1d schematic diagrams respectively show of the concrete structure of certain embodiments of the present invention, which includes a light source 48011, a light source 48012, a main light splitting surface 4801, several polarizers 4802, a transmissive dioptric component 4803, a transmissive dioptric component 4804 and a transmissive dioptric component 4805.

This embodiment proposes another solution of overlapping nesting of images of different sizes.

As shown in the FIG. 1a, the main light splitting plane 4801 can be a common optical splitter or a polarized optical splitter. As an extra transmissive dioptric component 4804 is added, the light emitted by the light source 48011 only passes through the transmissive dioptric component 4803 after two reflections; the light emitted by the light source 48012 first passes through the transmissive dioptric component 4804 and then through the transmissive dioptric component 4803. Due to the different lengths of the final light paths of the light emitted by the two light sources and the different dioptric components through which the light passes, the equivalent focal lengths of the two light paths are different, resulting in different sizes of the two pictures, one of which is smaller in the center and clearer, and the other of which is larger in the periphery and blurry.

Solution Two

This embodiment proposes another solution of overlapping nesting of images of different sizes.

Figure 1B:
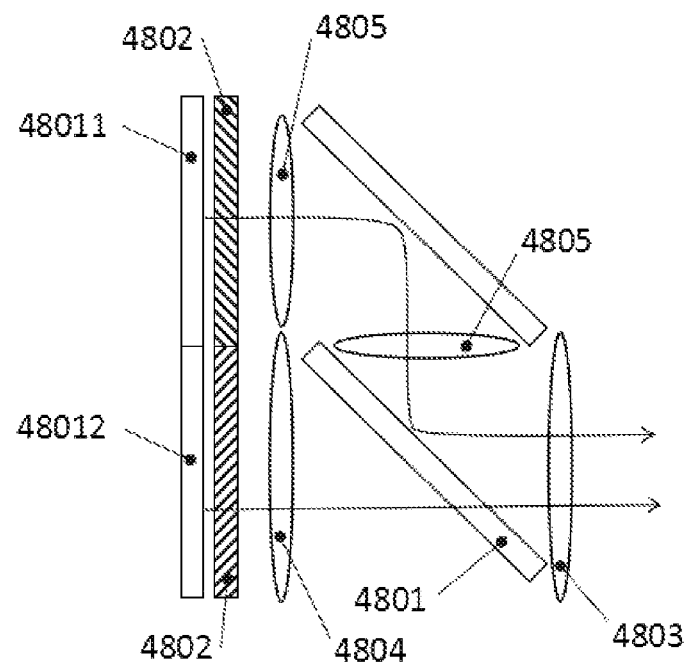
FIG. 1b shows the concrete structural diagram of another embodiment of the present invention.

As shown in FIG. 1b, as an option, several polarizers 4802 can be additionally added to achieve better spectral isolation characteristics. Alternatively, one or more transmissive dioptric components 4805 can be added at the illustrated position to realize different focal length combinations or dynamic adjustment of the focal length.

Solution Three

This embodiment proposes another solution of overlapping nesting of images of different sizes.

Figure 1C:
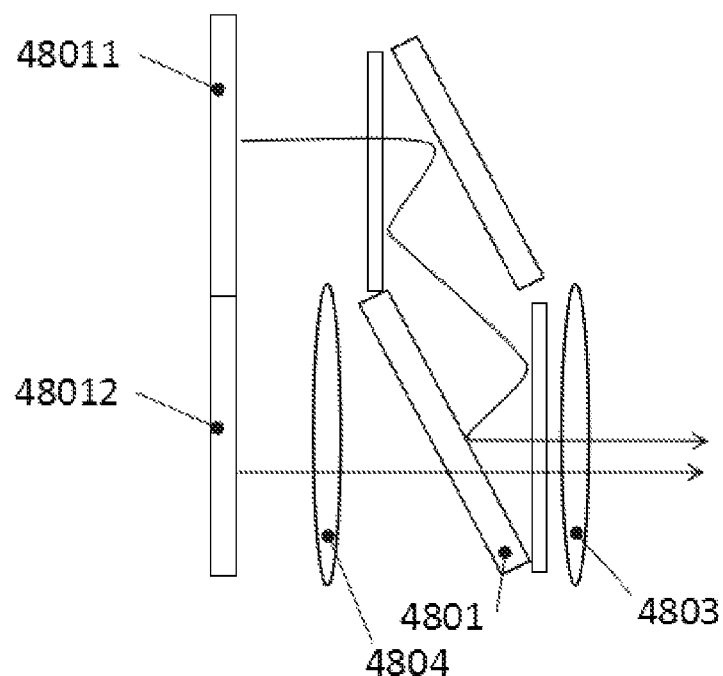
FIG. 1c shows the concrete structural diagram of a further embodiment of the present invention.

As shown in FIG. 1c, the main light splitting plane 4801 can be a common optical splitter or a polarized optical splitter. Different from other solutions before, the light emitted by light source 48011 is reflected four times and then passed through transmissive dioptric component 4803. This four-reflection structure can be realized by the combination of multiple reflecting surfaces as shown in the FIGURE, or by the waveguide total reflection splitting prism with the same shape.

Solution Four

This embodiment proposes another solution of overlapping nesting of images of different sizes.

Figure 1D:
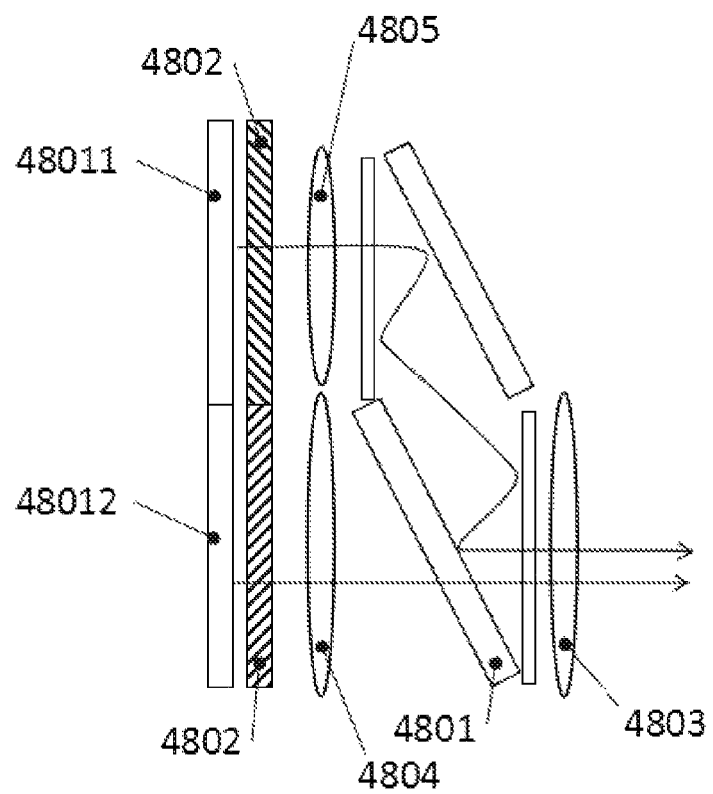
FIG. 1d shows the concrete structural diagram of yet another embodiment of the present invention.

As shown in FIG. 1d, as an option, several polarizers 4802 can be additionally added to achieve better spectral isolation characteristics. Alternatively, a transmissive dioptric component 4805 can be added at the illustrated position to realize different focal length combinations or dynamic adjustment of the focal length.

At the same time, what is not described in detail in this specification belongs to the prior art known to those skilled in the art.

It should be noted that in this specification that relational terms such as first and second are only used to distinguish one entity or operation from another entity or operation, without necessarily requiring or implying any such actual relationship or order between these entities or operations. Furthermore, the terms "including", "including" or any other variant thereof are intended to cover non-exclusive inclusion, so that a process, method, article or equipment that includes a series of elements includes not only those elements, but also other elements not explicitly listed, or elements inherent to such process, method, article or equipment.

Although the embodiments of the present invention have been shown and described, it will be understood by ordinary technicians in the field that many changes, modifications, substitutions and variations can be made to these embodiments without departing from the principle and spirit of the present invention, and the scope of the present invention is defined by the appended claims and their equivalents.

What is claimed is:

1. A thin type large field of view near-eye display device, comprising:
    two or more radial reflection units arranged in front of human eyes to generate two or more sub-images, which are spliced into a larger image on the retina of human eyes, so as to realize a near-eye display effect with a large field of view in a thinner volume,
    wherein the radial reflection unit comprises a light source, a reflecting surface, a transmissive dioptric apparatus and/or a reflective optical component, and the light emitted by the light source is refracted and amplified by the transmissive dioptric apparatus or the reflective optical component, so that human eyes can see clearly, and
    wherein two display light paths with different light path lengths project two sub-images with overlapping centers on the retina of human eyes, one sub-image is larger, which provides a wide edge field of vision, and the other sub-image is smaller, which provides a high-definition field of vision in the center, thereby providing a near-eye display effect with a wide field of view and a clear center.

2. The thin type large field of view near-eye display device according to claim 1, wherein the light sources used by the two different display light paths come from different areas of a same screen, so only one screen is needed, thereby reducing the cost.

3. The thin type large field of view near-eye display device according to claim 1, wherein the display light path unit comprises a light source, a reflecting surface, a transmissive dioptric apparatus and/or a reflective optical component.

4. The thin type large field of view near-eye display device according to claim 1, wherein the light emitted by the light source is reflected twice or more in the process of being reflected into a final outgoing light, and finally enters the human eyes.

5. The thin type large field of view near-eye display device according to claim 4, wherein the display light path comprises a multi-reflection structure, which comprises multiple reflecting surfaces and/or polarizers, and/or multi-reflection prisms, and/or multi-reflection waveguide plates, and/or polarization transmitters, and/or polarization changing reflectors and/or polarization changers.

\* \* \* \* \*